(12) United States Patent
Wilkinson et al.

(10) Patent No.: US 7,485,028 B2
(45) Date of Patent: Feb. 3, 2009

(54) CHEMICAL MECHANICAL POLISHING RETAINING RING, APPARATUSES AND METHODS INCORPORATING SAME

(75) Inventors: David Wilkinson, Aliso Viejo, CA (US); Colleen E. Hamilton, Orange, CA (US); Bryan David Hirschorn, Leominster, MA (US); Michael John Mangaudis, Worcester, MA (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 142 days.

(21) Appl. No.: 11/053,604

(22) Filed: Feb. 8, 2005

(65) Prior Publication Data

US 2005/0215181 A1 Sep. 29, 2005

Related U.S. Application Data

(63) Continuation-in-part of application No. 10/804,569, filed on Mar. 19, 2004, now Pat. No. 7,086,939.

(51) Int. Cl.
*B24B 1/00* (2006.01)

(52) U.S. Cl. .............................. 451/41; 451/28; 451/287

(58) Field of Classification Search .................. 451/41, 451/285–289, 397
See application file for complete search history.

(56) References Cited

U.S. PATENT DOCUMENTS

| | | | |
|---|---|---|---|
| 5,944,593 A | 8/1999 | Chiu et al. | |
| 6,062,963 A | 5/2000 | Lin et al. | |
| 6,136,713 A | 10/2000 | Chen et al. | |
| 6,186,880 B1 | 2/2001 | Gonzalez et al. | |
| 6,224,472 B1 | 5/2001 | Lai et al. | |
| 6,234,875 B1 | 5/2001 | Pendergrass, Jr. | |
| 6,251,215 B1 | 6/2001 | Zuniga et al. | |
| 6,347,979 B1 | 2/2002 | Drill | |
| 6,390,904 B1 | 5/2002 | Gleason et al. | |
| 6,413,153 B1 | 7/2002 | Molar | |
| 6,419,567 B1 | 7/2002 | Glashauser | |
| 6,468,136 B1 | 10/2002 | Lum et al. | |
| 6,471,566 B1 | 10/2002 | Mikhaylich et al. | |
| 6,602,114 B1 | 8/2003 | Wang et al. | |
| 6,612,917 B2 | 9/2003 | Bruxvoort | |
| 6,623,337 B2 | 9/2003 | Scott et al. | |
| 6,641,463 B1 | 11/2003 | Molnar | |
| 6,705,932 B1 | 3/2004 | Zuniga et al. | |
| 6,719,615 B1 | 4/2004 | Molnar | |
| 6,758,939 B2 | 7/2004 | Marquardt et al. | |
| 6,899,610 B2 | 5/2005 | Cooper et al. | |
| 8,693,327 * | 5/2005 | Kajiwara et al. | 451/41 |
| 7,086,939 B2 * | 8/2006 | Wilkinson et al. | 452/41 |
| 2002/0058426 A1 | 5/2002 | Mandigo et al. | |

(Continued)

FOREIGN PATENT DOCUMENTS

| | | |
|---|---|---|
| EP | 1 243 617 A1 | 9/2002 |
| EP | 1 386 695 A2 | 2/2004 |
| EP | 1 418 614 A1 | 5/2004 |
| WO | WO 02/066207 A1 | 8/2002 |

*Primary Examiner*—Lee D Wilson
(74) *Attorney, Agent, or Firm*—Larson Newman Abel & Polansky LLP; Chi Suk Kim

(57) ABSTRACT

The disclosure is directed to a chemical mechanical polishing retaining ring including a polymer matrix and a filler including polyimide. The chemical mechanical polishing retaining ring has a wear rate performance not greater than about 75 microns/hour.

29 Claims, 2 Drawing Sheets

U.S. PATENT DOCUMENTS

| | | |
|---|---|---|
| 2002/0106980 A1 | 8/2002 | Bruxvoort |
| 2002/0111120 A1 | 8/2002 | Goetz |
| 2002/0173255 A1 | 11/2002 | Shendon et al. |
| 2003/0148614 A1 | 8/2003 | Simpson et al. |
| 2004/0023609 A1 | 2/2004 | Oshita et al. |
| 2004/0040656 A1 | 3/2004 | Hengel, Jr. et al. |
| 2004/0065412 A1 | 4/2004 | Ensinger |
| 2004/0067723 A1 | 4/2004 | Ensinger |
| 2005/0208881 A1* | 9/2005 | Wilkinson et al. ............ 451/41 |
| 2005/0215181 A1* | 9/2005 | Wilkinson et al. ............ 451/41 |

* cited by examiner

CHEMICAL MECHANICAL POLISHING RETAINING RING, APPARATUSES AND METHODS INCORPORATING SAME

CROSS-REFERENCE TO RELATED APPLICATIONS

The present application is a continuation-in-part and claims priority from U.S. patent application Ser. No. 10/804,569, filed Mar. 19, 2004 now U.S. Pat. No. 7,086,939, entitled "CHEMICAL MECHANICAL POLISHING RETAINING RING WITH INTEGRAL POLYMER BACKING" naming inventors David Wilkinson, Colleen E. Hamilton, Bryan David Hirschom, and Michael John Mangaudis, which application is incorporated by reference herein in its entirety.

FIELD OF THE DISCLOSURE

The disclosure, in general, relates to chemical mechanical polishing retaining rings, apparatuses incorporating same, and methods for performing chemical mechanical polishing.

BACKGROUND

In semiconductor fabrication, chemical mechanical polishing (CMP) is used for planarization of semiconductor wafers that may be used for the fabrication of integrated circuits, including very large scale integrated (VLSI) circuits and ultra large scale integrated (ULFI) circuits. Chemical mechanical polishing (CMP) is employed to remove material from a deposited layer on a wafer substrate. In a typical CMP process, the wafer is exposed to an abrasive medium under controlled chemical, pressure, velocity, and temperature conditions. The abrasive medium may include slurry solutions containing small abrasive particles, such as silicon dioxide, and chemically reactive substances, such as potassium hydroxide.

Typical chemical mechanical polishing (CMP) processes include a carrier head that holds a wafer against a polishing pad. One or both of the polishing pad or carrier head may rotate to effect the polishing of the wafer. Generally, carrier heads include a retaining ring used to hold the wafer within a given boundary. In general, retaining rings are formed either completely of a metal construction or a metal backing with a ring portion of polymer or silicon dioxide. The ring portion typically contacts the polishing pad or surface and the semiconductor wafer.

However, typical CMP retaining ring designs wear rapidly or are expensive. In addition, these designs may cause damage to wafer edges and surfaces. These designs may further lead to scratched wafer surfaces and altered device properties. As such, an improved CMP retaining ring would be desirable.

SUMMARY

In one particular embodiment, the disclosure is directed to a chemical mechanical polishing retaining ring including a polymer matrix and a filler including polyimide. The chemical mechanical polishing retaining ring has a wear rate performance not greater than about 75 microns/hour.

In another exemplary embodiment, the disclosure is directed to a chemical mechanical polishing retaining ring including a polymer matrix and a filler including polyimide.

In a further example, the disclosure is directed to a chemical mechanical polishing apparatus including a polishing pad having a polishing surface and a substrate carrier head overlying the polishing pad. The substrate carrier head includes a substrate backing member and a retaining ring. The retaining ring includes a polymer matrix and a filler including polyimide.

In other exemplary embodiment, the disclosure is directed to a method of forming a semiconductor device. The method includes forming a semiconductor circuitry on a substrate wafer including depositing a layer on the substrate wafer and loading the substrate wafer in a CMP apparatus. The CMP apparatus includes a substrate carrier head and a polishing pad. The substrate wafer is provided on the polishing pad and the carrier head overlies the substrate wafer and polishing pad. The carrier head includes a substrate backing member and a retaining ring surrounding the substrate wafer. The retaining ring includes a polymer matrix and a filler including polyimide. The method further includes translating the polishing pad relative to the substrate wafer to remove material therefrom.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION OF THE DRAWINGS

The disclosure is directed to a chemical mechanical polishing (CMP) apparatus having a CMP retaining ring. In one particular embodiment, the CMP retaining ring is formed of a polymer matrix and a filler comprising polyimide. The CMP retaining ring may be formed as a single piece (monolithic structure) including the polymer matrix and the filler. In another example, the CMP retaining ring may have a multi-component structure, including a first portion that includes the polymer matrix and filler and a second portion formed of a polymer or metal. For example, the first portion may form a wear portion of the CMP retaining ring and the second portion may form a backing or support structure. The wear portion is generally configured to contact a translating (e.g. rotating) member. In one exemplary embodiment, the single piece CMP retaining ring or the wear portion of a multi-piece CMP retaining ring has a wear rate performance not greater than 75 microns per hour.

Figure 1:
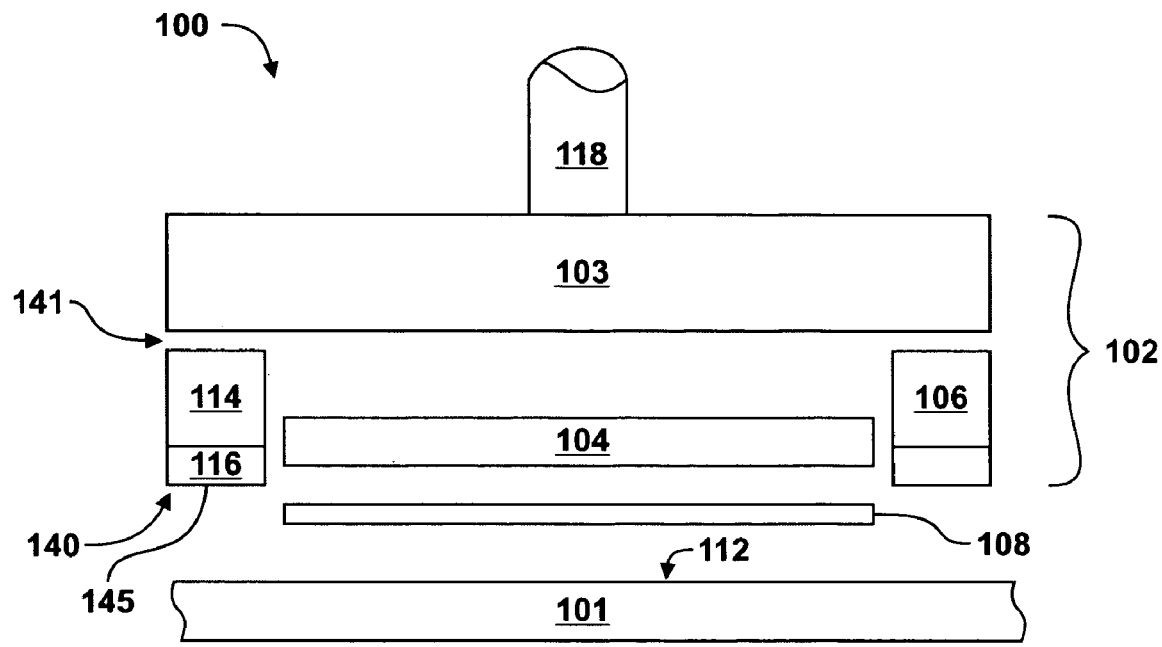
FIG. 1 includes a diagram illustrating an exemplary chemical mechanical polishing apparatus.

FIG. 1 depicts an exemplary chemical mechanical polishing (CMP) apparatus 100. The CMP apparatus 100 includes a carrier 102 and a polishing pad 101 having a polishing surface 112. The carrier 102 includes a carrier body 103, a wafer backing member 104, and retaining ring 106. The retaining ring 106 and the wafer backing member 104 hold a wafer 108 in place and in contact with the wafer polishing surface 112 during the CMP process. Various mechanisms (not illustrated) may be used to exert force on wafer 108, such as bellows and other pneumatic mechanisms, which cause wafer backing member 104 to exert force on the wafer 108 in contact with the polishing surface 112. In practice, the polishing may be accomplished with the introduction of a chemical mechanical abrasive medium. The carrier 102 and/or the polishing pad 101 may rotate to facilitate mechanical abrasion.

The retaining ring 106 acts to retain or surround the wafer 108 and horizontally hold the wafer 108 in contact with the wafer backing member 104. The retaining ring 106 generally surrounds the wafer backing member 104. The retaining ring 106 generally extends below the wafer backing member 104 to form a recess for receiving the wafer 108 and effectively bounds the wafer 108. The CMP retaining ring 106 generally contacts the chemical mechanical polishing surface 112 during a CMP process. In an alternative embodiment, the retaining ring 106 may extend partially along the vertical edge of the wafer and may or may not contact the polishing surface 112 during the CMP process. The retaining ring 106 may be connected to the carrier body 103 using various mechanisms such as fasteners, latches, screws, pins, adhesives, and other connecting or coupling methods.

In the exemplary embodiment of FIG. 1, the retaining ring 106 includes a first axial end 140 and a second axial end 141. The first axial end 140 includes a surface 145 that may be configured to contact the polishing pad 101. The retaining ring 106 may include an upper backing portion 114 defining the second axial end 141 and a lower contact or wear portion 116 defining the first axial end 140 and extending to and defining the contact surface 145. In this exemplary embodiment, the lower portion 116 contacts both the wafer 108 and the polishing surface 112 during a CMP process. In an alternative embodiment, the CMP retaining ring 106 may be formed as a single piece. In either case, and for alternative constructions, generally the polymer matrix including filler extends to and defines the contact surface or wear surface 145 for those retaining rings adapted to or intended to directly contact a polishing pad of a CMP apparatus.

In one particular embodiment, a single piece CMP retaining ring 106 or the wear portion 116 of the CMP retaining ring 106 may be formed of a polymer matrix and filler. The polymer matrix may be a polymer, such as such as polyphenylsulfide (PPS), polyethylene terephthalate (PET), polyetheretherketone (PEEK), polyimide (PI), and polybutylene terephthalate (PBT), acetal polyoxymethylene (POM), polyamideimide (PAI), polybenzimidazole (PBI), or combinations thereof. In one exemplary embodiment, the polymer may be a crosslinked single polymer or a crosslinked blend of polymers.

The polymer matrix includes filler. Generally, the filler forms a separate solid phase dispersed in the polymer matrix. In one particular embodiment, the filler is polyimide (PI). In an alternative embodiment, the filler includes polybenzimidazole (PBI). The filler may be in the form of fibers, spheres, pellets, or particles. In one exemplary embodiment, the filler includes milled or ground particles having a largest dimension not greater than about 150 microns, such as not greater than about 100 microns, not greater than about 75 microns, or not greater than about 50 microns. The filler may be loaded in percentages about 5%-95% by weight, based on the total weight of the polymer matrix and filler. For example, the filler may be loaded in percentages about 5%-50% by weight, such as about 5%-30% by weight or about 20%-50% by weight. In another exemplary embodiment, the filler may be loaded in percentages about 50% and 85% by weight. In one particular embodiment, the loading of the filler in the polymer matrix, based on the total weight of the polymer matrix and filler, is about 6% to about 90% by weight, such as about 10% to about 75% by weight, or about 38% to about 75% by weight.

The polymer matrix may further include plasticizers, colorants, antioxidizing agents, or UV protectorants. In addition the polymer matrix may include additional fillers such as carbon, aramide, $TiO_2$, $SiO_2$, alumina, boron nitride, silicon carbide, PTFE, or polyester. However in one particular embodiment, the polymer matrix includes polyimide filler and is generally free of other fillers. The CMP retaining ring may be formed by various techniques, such as injection molding and compression molding.

In one exemplary embodiment, the single piece CMP retaining ring or the wear portion of a multi-piece CMP retaining ring has an elastic modulus of at least about 350 kpsi, such as at least about 400 kpsi or at least about 550 kpsi. In another exemplary embodiment, the single piece CMP retaining ring or the wear portion of the multi-piece CMP retaining ring has a Vicker's hardness of at least about 25 kpsi, such as at least about 30 kpsi. In a further exemplary embodiment, the single piece CMP retaining ring or the wear portion of the multi-piece CMP retaining ring has a density of about 1.30 to about 1.43 $g/cm^3$, such as approximately 1.32 $g/cm^3$. For example, the portion of the ring may have an elastic modulus of approximately 580 kpsi and a Vicker's hardness of approximately 32 kpsi.

In one exemplary embodiment, the retaining ring has a wear rate performance not greater than about 75 microns per hour, based on the testing method described below in the example section. For example, a retaining ring may have a wear rate performance that is not greater than about 60 microns per hour, such as not greater than about 50 microns per hour, or not greater than about 35 microns per hour. In one particular embodiment, a loading of approximately 6 wt % PI and a PEEK polymer matrix produces a retaining ring with a wear rate performance not greater than about 75 microns/hour. In another exemplary embodiment, a loading of approximately 35-45 wt % PI in a PEEK polymer matrix produces a CMP retaining ring having a wear rate performance not greater than about 52 microns/hour. In a further exemplary embodiment, a loading of approximately 75 wt % PI filler in a PEEK polymer matrix produces a retaining ring having a wear rate performance not greater than about 35 microns/hour.

In another exemplary embodiment, the CMP retaining ring formed of a polymer matrix having a PI filler may have a coefficient of friction not greater than about 1.4, based on the testing method described below in the example section. For example, the CMP retaining ring may have a coefficient of friction not greater than about 1.35, such as not greater than about 1.30.

In another exemplary embodiment, the CMP retaining ring having a PI filler in a PEEK matrix may exhibit limited inner groove wear, such as being free of inner groove wear. In one particular embodiment, the inner groove wear exhibited by a retaining ring formed of a polymer matrix including polyimide filler has an inner groove wear rate approximately equal to the inner groove wear rate exhibited by a Techtron PPS retaining ring. In another exemplary embodiment, the inner groove wear is at least 25% less than a carbon filled PEEK retaining ring, such as 30% less, and in another embodiment, 30% more than an polyethylene teraphthalate (PET) retaining ring, such as an Ertalyte® retaining ring.

In a further exemplary embodiment, the CMP retaining ring exhibits a break-in time performance not greater than about 9 minutes, based on the testing method described below in the example section. For example, the break-in time performance is not greater than about 8.0 minutes, such as not greater than about 7.5 minutes. In one particular embodiment, a CMP retaining ring with a loading not greater than approximately 40 wt % PI in a PEEK polymer matrix exhibits a break-in time performance not greater than about 7.5 minutes.

In another exemplary embodiment, the retaining ring has a defectivity performance not greater than 1.05. The defectivity performance is a measurement of the retaining ring's influence on silicon wafer quality. A testing method for determining defectivity performance is described below in the example section. For example, the CMP retaining ring may have a defectivity performance not greater than 0.95, such as not greater than about 0.86, or not greater than about 0.76.

In a further exemplary embodiment, the CMP retaining ring exhibits a within wafer non-uniformity (WWNU) performance, as defined in the example section below, of not greater than 1.25. The within wafer non-uniformity (WWNU) performance is a measurement of the retaining ring's influence on wear uniformity and a testing method for determining the WWNU performance is described below in the example section. For example, a CMP retaining ring may exhibit a WWNU performance of not greater than 1.14, such as not greater than about 0.87.

In a further exemplary embodiment, the CMP retaining ring exhibits improved performance in removal of material. The material removal performance is a measurement of the influence of the retaining ring on removal rates of non-oxide material and is defined in the testing methods described below in the example section. For example, the CMP retaining ring may exhibit a material removal performance, such as for a non-oxide material, such as silicon, of at least about 1,200 A/min, such as at least about 1,300 A/min, at least about 1,350 A/min, or about 1,400 A/min. In another exemplary embodiment, the material removal performance may be characterized by an oxide material removal performance, as defined in the testing method described below in the example section. The CMP retaining ring may exhibit an oxide removal rate performance of at least about 100 mm/min, such as at least about 10 mm/min.

Figure 2:
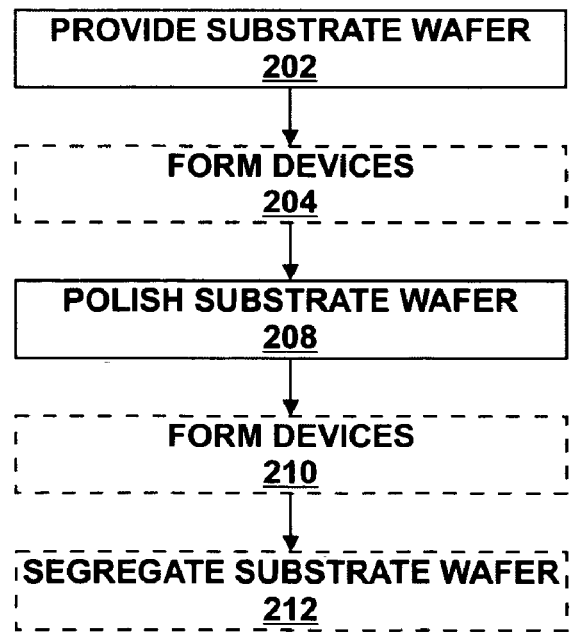
FIG. 2 includes a flow diagram illustrating an exemplary method of chemical mechanical polishing.

A CMP process utilizing the exemplary retaining rings may be used to form semiconductor and integrated circuit devices. In one exemplary method shown in FIG. 2, a substrate wafer may be provided, as illustrated at 202. The substrate wafer may, for example be formed of silicon or gallium. CMP processes may be used at various points during the integrated circuit process. In one exemplary embodiment, devices may be formed or partially formed on the substrate wafer, as illustrated at 204, and the wafer subsequently polished, as illustrated at 208. For example, devices may be formed in the wafer and connected using a conductive metal layer. CMP processing may be used to remove excess conductive metal to form lines and interconnects. In one exemplary embodiment, metal, such as tungsten, aluminum, copper, or alloys of thereof, is sputtered or deposited on the wafer surface. Excess metal is polished and removed to leave patterned lines of interconnects and expose an underlying dielectric layer.

In another exemplary embodiment, the wafer may be polished, as illustrated at 208, and devices formed, as illustrated at 210. CMP processes may, for example, be used on the front end polishing prior to and during integrated circuit formation. In another exemplary embodiment, CMP polishing may be used in back end processing to reduce wafer thickness.

The polishing shown at step 208 may be performed with a chemical mechanical polishing apparatus that includes a retaining ring fully or partially formed of a polyimide filled polymer (as described above). CMP processing may utilize slurry containing an abrasive medium. The slurry may include oxidizers, such as hydrogen peroxide or potassium hydroxide; etchants, such as organic acids; and corrosion inhibitors, such as benzotriazole (BTA). The slurry may further include abrasives, such as alumina or silica.

The substrate wafer may then be segregated into individual integrated circuit devices, as illustrated at 212, and further processed to allow connection to and use of the integrated circuit. Such a process utilizing the CMP apparatus with the retaining ring may improve yield and effectiveness of integrated circuit devices.

Exemplary embodiments of the CMP retaining ring include a polymer matrix and polyimide filler and exhibit comparable or improved performance characteristics at a lower cost relative to other typical retaining rings. Such improved performance may lead to improved semiconductor and integrated devices that have lower costs.

EXAMPLES

An exemplary CMP retaining ring formed with a PEEK polymer matrix including a polyimide filler is tested relative to CMP retaining rings formed of virgin PPS, virgin PEEK, PEEK with a carbon filler, and virgin PI. The CMP retaining ring including a PEEK polymer matrix and polyimide filler is formed using 50 micron milled particles of PI extruded with a PEEK melt such that the PI material remains in crystalline solid form and forms about 15 wt % based on the total weight of the PEEK melt and PI filler. The exemplary CMP retaining ring is formed by injection molding.

The CMP retaining rings are tested for wear resistance, coefficient of friction, inner groove wear, break-in time performance, defectivity performance, WWNU performance, material removal performance, oxidized material removal performance, and material properties, such as density, elasticity modulus and Vicker's hardness. In most cases, the chemical mechanical polishing ring having the PEEK polymer matrix including PI filler exhibits equivalent or improved performance while having a lower effective cost.

Example 1

Wear resistance is tested to determine the wear rate performance of different ring materials within a CMP process regime based on the following testing method. Ring materials exhibiting lower wear rate performance have improved wear resistance.

The testing method includes polishing an exemplary CMP retaining ring for one hour using a 75 ml per minute slurry flow rate of Cabot SS12 slurry. The CMP processing apparatus includes a Rodel K-groove (IC1400) pad. The platten is rotated counter-clockwise at 300 RPM and the head is rotated counter-clockwise at 60 RPM. A down force of 50 lbf is applied, giving a pressure of 10.5 psi on the ring. Table 1 provides the resulting wear rate performance for exemplary materials.

TABLE 1

| MATERIAL | WEAR RATE PERFORMANCE (microns/hr) |
|---|---|
| PPS | 160 |
| PEEK | 84 |
| PEEK w/PI FILLER | 55 |
| PEEK w/CARBON FILLER | 43 |
| PI | 29 |

Figure 3:
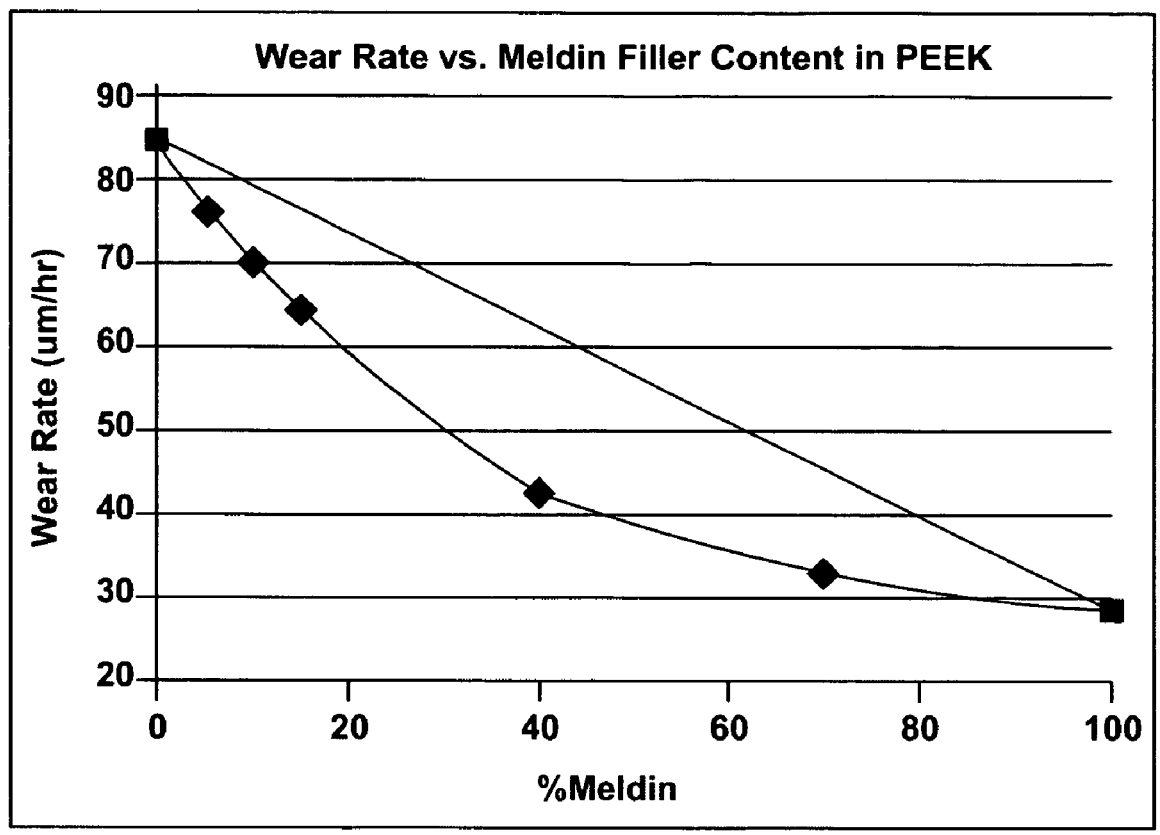
FIG. 3 includes a graph illustrating the effect of polyimide filler loading on wear performance.

The PI filled CMP retaining ring exhibits improved wear resistance over traditional PPS and PEEK retaining ring while performing near that of more expensive materials, such as pure PI retaining rings. FIG. 3 illustrates the effect of loading of PI filler, such as Meldin®, on wear resistance for compression molded retaining rings. A loading of approximately 5-6 wt % PI filler exhibits a wear rate performance of not greater than 75 microns per hour. A loading between 35 and 40 weight percent PI filler provides a wear rate performance not greater than 52 microns per hour and a loading of between 70 and 75 weight percent PI filler in a polymer matrix provides a wear rate performance not greater than about 32 microns per hour.

Example 2

The exemplary CMP retaining rings are tested for coefficient of friction (COF) utilizing a Hall Effect transducer to measure motor electric current, which supplies the torque to drive the tool's rotor. Electric power measurements generated from the transducer are used to calculate the coefficient of friction values using polishing kinematics. The specific method for calculation of the COF data is the pressure X velocity (PV) method. Down pressure is applied to the ring and the velocity is measured relative to the velocity between the ring and the polishing pad. The processing conditions include a slurry flow of 75 ml per minute of Cabot SS12 slurry. The platten is rotated counter-clockwise at 150 RPM and the head rotated counter-clockwise at 60 RPM. The pad is a Rodel K-groove (IC1400) pad. A down force of 15 lbf is applied to produce a pressure of 3.14 psi on the ring over a polishing time of 20 minutes.

Table 2 illustrates the results of the COF measurements for various materials. The PI filled CMP retaining ring exhibits a comparable coefficient of friction with that of other traditionally used materials.

TABLE 2

| MATERIAL | COF |
| --- | --- |
| PPS | 1.53 |
| PEEK | 1.18 |
| PEEK w/PI FILLER | 1.30 |
| PEEK w/CARBON FILLER | 0.7 |
| PI | 1.44 |

Example 3

Break-in time performance is a measurement of the time required for the ring to conform to the CMP pad so that it is ready for wafer generation. The break-in time performance test simulates break-in time by measuring the change in surface finish of the ring material as it polishes with respect to time. Generated data is fitted to a decaying exponential function. The break-in time performance is the time at which the retaining ring reaches 95% of a steady state surface finish. Steady state surface finish is defined by a relatively small or an absence of change in surface finish with time. The rings are polished for a total time of 20 minutes with surface finish measurements taken at 0.5, 1, 2, 4, 8, 12, and 20 minutes. The measurements are performed with a Zygo white light interferometer. The slurry and CMP apparatus conditions are the same as described above in relation to the coefficient of friction test. Table 3 includes break-in time performance data for the materials tested.

TABLE 3

| MATERIAL | BREAK-IN TIME PERFORMANCE (min) |
| --- | --- |
| PPS | 6.2 |
| PEEK | 8.0 |

TABLE 3-continued

| MATERIAL | BREAK-IN TIME PERFORMANCE (min) |
| --- | --- |
| PEEK w/PI FILLER | 7.5 |
| PEEK w/CARBON FILLER | 8.2 |
| PI | 7.9 |

The polyimide filled material exhibits improved break-in time performance relative to most materials.

Example 4

Exemplary performance characteristics of the CMP retaining ring are determined through processing of wafers using a standard set of processing parameters. The wafers are subsequently tested to determine the effect of the CMP retaining ring material on the quality of the wafer. In one example, defectivity performance was measured to determine the effect of the ring material on the quality of the silicon wafer, such as micro roughness. The defectivity is measured utilizing background light scattering from the wafer surface. The defectivity performance is the ratio of light scattering of a wafer polished by an apparatus using the tested ring relative to the light scattering of a wafer polished by an apparatus using a PPS standard ring.

In the defectivity performance test, low particle PE TEOS silicon wafers is polished for one hour in Cabot SS12 slurry at a slurry flow rate of 200 ml/min. The system used a Rodel K-groove (IC1400) pad. The platten is rotated counter-clockwise at 30 RPM and the head is rotated counter-clockwise at 34 RPM. A down pressure of 5 psi is applied and a back pressure of 1.2 psi is applied to the wafer.

For each retaining ring on a new pad, the process includes mounting the retaining ring into the wafer carrier head with a step height of 200-250 micrometers. The pad was conditioned for 5 minutes with deionized water and a dummy wafer is polished for 10 minutes. Subsequently, two wafers are polished for 3 minutes each and the dummy wafer is polished for 10 minutes. An additional two wafers are polished for additional 3 minutes each, and the dummy wafer is polished for 20 minutes. An additional two wafers are polished for three minutes each. Measurement of the background light scattering is performed using a KLA-Tencor SP1^TBI device. Table 4 provides the data for the various materials tested.

TABLE 4

| MATERIAL | DEFECTIVITY PERFORMANCE |
| --- | --- |
| PPS | 1.0 |
| PEEK | 0.86 |
| PEEK w/PI FILLER | 0.76 |
| PEEK w/CARBON FILLER | 1.04 |
| PI | 0.86 |

The CMP retaining ring including PI filler exhibits improved defectivity performance over the other exemplary retaining ring materials. Such improved performance may lead to improved surface quality, which may lead to improved semiconductors and integrated circuits.

Example 5

Within wafer non-uniformity (WWNU) performance and material removal performance were tested to determine the influence of different ring materials on silicon wafer quality.

WWNU performance is a ratio of the polishing uniformity of a wafer surface resulting from use of a particular CMP retaining ring material in a standard CMP processing apparatus relative to the polishing uniformity of a wafer surface resulting from use of a PPS CMP retaining ring in the standard CMP processing apparatus. Material removal performance is a measure of silicon wafer polishing rate and the effect of that particular material CMP retaining ring on that rate. The material removal performance may be tested using non-oxidized or oxidized silicon surfaces.

For the WWNU and material removal performance tests, the wafer and processing parameters for testing the different ring material are the same as those described in relation to Example 4. Each retaining ring is prepared using the process described in Example 4. WWNU performance is tested using a Filmetrics Model F20 spectrometer. Tables 5, 6, and 7 respectively illustrate the exemplary data of WWNU performance, non-oxide material removal performance, and oxide material removal performance.

TABLE 5

| MATERIAL | WIWNU PERFORMANCE |
| --- | --- |
| PPS | 1.0 |
| PEEK | 0.79 |
| PEEK w/PI FILLER | 1.06 |
| PEEK w/CARBON FILLER | 0.95 |
| PI | 0.93 |

TABLE 6

| MATERIAL | MATERIAL REMOVAL RATE PERFORMANCE (A/min) |
| --- | --- |
| PPS | 1510 |
| PEEK | 1600 |
| PEEK w/PI FILLER | 1400 |
| PEEK w/CARBON FILLER | 1560 |
| PI | 1240 |

TABLE 7

| MATERIAL | OXIDE REMOVAL RATE PERFORMANCE (mm/min) |
| --- | --- |
| PPS | 125 |
| PEEK | 144 |
| PEEK w/PI FILLER | 120 |
| PEEK w/CARBON FILLER | 140 |
| PI | 130 |

The polyimide filled CMP retaining ring exhibits comparable WWNU performance, material removal performance and oxide material removal performance to the other retaining ring materials tested.

Example 6

The ring materials are also tested for physical properties. Table 8 illustrates test results for density, elasticity modulus and Vicker's hardness of exemplary ring materials.

TABLE 8

| MATERIAL | Density (g/cm$^3$) | EMOD (kpsi) | Vicker's Hardness (kpsi) |
| --- | --- | --- | --- |
| PPS | 1.36 | 580 | 33 |
| Ertalyte ® | 1.44 | 580 | 25 |
| PEEK | 1.30 | 638 | 32 |
| PEEK w/PI FILLER | 1.32 | 580 | 32 |
| PEEK w/CARBON FLR | 1.41 | 957 | 45 |
| PI | 1.43 | 551 | 26 |

The PI filled CMP retaining ring exhibits comparable density, elasticity modulus and Vicker's hardness.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A chemical mechanical polishing retaining ring comprising a polymer matrix and a filler forming a separate solid phase dispersed in the polymer matrix, the polymer matrix and filler forming a heterogeneous material, the filler comprising polyimide, the chemical mechanical polishing retaining ring having a wear rate performance not greater than about 75 microns/hour, the wear rate performance determinable by abrading the chemical mechanical polishing retaining ring in a processing apparatus for one hour using a 75 ml per minute slurry flow rate of Cabot SS12 slurry, the processing apparatus including a Rodel K- groove (IC1400) pad and a head that secures the chemical mechanical polishing retaining ring, the pad being rotated counter-clockwise at 300 RPM and the head being rotated counter-clockwise at 60 RPM, a down force of 50 lb$_f$ being applied by the head, giving a pressure of 10.5 psi on the chemical mechanical polishing retaining ring.

2. The chemical mechanical polishing retaining ring of claim 1, wherein the filler comprises about 6% to about 90% by weight of the total weight of the polymer matrix and the filler.

3. The chemical mechanical polishing retaining ring of claim 1, wherein the chemical mechanical polishing retaining ring has a coefficient of friction not greater than about 1.4.

4. The chemical mechanical polishing retaining ring of claim 1, wherein the chemical mechanical polishing retaining ring has a break-in time performance not greater than about 9.0 minutes.

5. The chemical mechanical polishing retaining ring of claim 1, wherein the chemical mechanical polishing retaining ring has a material removal performance at least about 1200 A/mm.

6. The chemical mechanical polishing retaining ring of claim 1, wherein a first portion of the chemical mechanical polishing retaining ring includes the polymer matrix and the filler, and wherein the chemical mechanical polishing retaining ring further comprises a second portion.

7. The chemical mechanical polishing retaining ring of claim 6, wherein the first portion comprises a wear portion and the second portion comprises a support portion, wherein the retaining ring has first and second opposite axial ends, the wear portion defining the first axial end and the support portion defining the second axial end.

8. The chemical mechanical polishing retaining ring of claim 7, wherein the wear portion extends to and defines a contact surface of the retaining ring.

9. The chemical mechanical polishing retaining ring of claim 8, wherein the wear portion defines the entirety of the contact surface.

10. The chemical mechanical polishing retaining ring of claim 6, wherein the second portion comprises polymer.

11. The chemical mechanical polishing retaining ring of claim 6, wherein the first portion has an elasticity modulus of at least about 550 kpsi.

12. The chemical mechanical polishing retaining ring of claim 6, wherein the first portion has a Vicker's hardness of at least about 30 kpsi.

13. The chemical mechanical polishing retaining ring of claim 1, wherein the polymer matrix comprises PEEK.

14. The chemical mechanical polishing retaining ring of claim 1, wherein the filler is selected from a group comprising fibers, spheres, particulate, and pellets.

15. A chemical mechanical polishing retaining ring comprising a polymer matrix and a filler forming a separate solid phase dispersed in the polymer matrix, the polymer matrix and filler forming a non-homogeneous material, the filler comprising polyimide, wherein the chemical mechanical polishing retaining ring has a wear rate performance not greater than about 75 microns/hour, the wear rate performance determinable by abrading the chemical mechanical polishing retaining ring in a processing apparatus for one hour using a 75 ml per minute slurry flow rate of Cabot SS12 slurry, the processing apparatus including a Rodel K-groove (IC1400) pad and a head that secures the chemical mechanical polishing retaining ring, the pad being rotated counter-clockwise at 300 RPM and the head being rotated counter-clockwise at 60 RPM, a down force of 50 $lb_f$ being applied by the head, giving a pressure of 10.5 psi on the chemical mechanical polishing retaining ring.

16. The chemical mechanical polishing retaining ring of claim 15, wherein the polymer matrix including the filler extends to and defines a contact surface.

17. The chemical mechanical polishing retaining ring of claim 15, wherein the polymer matrix and the filler comprise a first portion of the chemical mechanical polishing retaining ring, the chemical mechanical polishing retaining ring further comprising a second portion.

18. The chemical mechanical polishing retaining ring of claim 17, wherein the first portion comprises a wear portion and the second portion comprises a support portion, wherein the retaining ring has first and second opposite axial ends, the wear portion defining the first axial end and the support portion defining the second axial end.

19. The chemical mechanical polishing retaining ring of claim 17, wherein the first portion has an elasticity modulus of at least about 550 kpsi.

20. The chemical mechanical polishing retaining ring of claim 17, wherein the first portion has a Vicker's hardness of at least about 30 kpsi.

21. The chemical mechanical polishing retaining ring of claim 15, wherein the filler comprises about 6% to about 90% by weight of the total weight of the polymer matrix and the filler.

22. The chemical mechanical polishing retaining ring of claim 15, wherein the chemical mechanical polishing retaining ring has a coefficient of friction not greater than about 1.4.

23. The chemical mechanical polishing retaining ring of claim 15, wherein the polymer matrix comprises PEEK.

24. The chemical mechanical polishing retaining ring of claim 15, wherein the filler is selected from a group comprising fibers, spheres, particulate, and pellets.

25. A chemical mechanical polishing apparatus comprising:
a polishing pad having a polishing surface; and
a substrate carrier head overlying the polishing pad, the substrate carrier head comprising a substrate backing member and a retaining ring, the retaining ring comprising a polymer matrix and a filler forming a separate solid phase dispersed in the polymer matrix, the polymer matrix and filler forming a heterogeneous material, the filler comprising polyimide.

26. The chemical mechanical polishing apparatus of claim 25, wherein the retaining ring is configured to contact the polishing surface.

27. The chemical mechanical polishing apparatus of claim 25, wherein the retaining ring has a wear rate performance not greater than about 75 microns/hour, the wear rate performance determinable by abrading the chemical mechanical polishing retaining ring in a processing apparatus for one hour using a 75 ml per minute slurry flow rate of Cabot SS12 slurry, the processing apparatus including a Rodel K-groove (IC1400) pad and a head that secures the chemical mechanical polishing retaining ring, the pad being rotated counter-clockwise at 300 RPM and the head being rotated counter-clockwise at 60 RPM, a down force of 50 $lb_f$ being applied by the head, giving a pressure of 10.5 psi on the chemical mechanical polishing retaining ring.

28. The chemical mechanical polishing retaining ring of claim 25, wherein the polymer matrix comprises PEEK.

29. The chemical mechanical polishing retaining ring of claim 25, wherein the filler is selected from a group comprising fibers, spheres, particulate, and pellets.

* * * * *

UNITED STATES PATENT AND TRADEMARK OFFICE
CERTIFICATE OF CORRECTION

PATENT NO.         : 7,485,028 B2
APPLICATION NO.    : 11/053604
DATED              : February 3, 2009
INVENTOR(S)        : David Wilkinson et al.

Page 1 of 1

It is certified that error appears in the above-identified patent and that said Letters Patent is hereby corrected as shown below:

On the Title Pg, Item (56), please delete "8,693,327" and insert therefore --6,893,327--.

Column 2, line 4, please delete "other" and insert therefore --another--.

Column 5, line 32, please delete "10 mm/min" and insert therefore --110 mm/min--.

Column 10, line 56, please delete "A/mm" and insert therefore --A/min--.

Signed and Sealed this
First Day of May, 2012

David J. Kappos
*Director of the United States Patent and Trademark Office*